United States Patent
Shiobara et al.

(10) Patent No.: US 11,802,192 B2
(45) Date of Patent: Oct. 31, 2023

(54) LOW DIELECTRIC RESIN SUBSTRATE

(71) Applicant: SHIN-ETSU CHEMICAL CO., LTD., Tokyo (JP)

(72) Inventors: Toshio Shiobara, Annaka (JP); Yusuke Taguchi, Takasaki (JP); Hajime Itokawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 96 days.

(21) Appl. No.: 17/346,897

(22) Filed: Jun. 14, 2021

(65) Prior Publication Data
US 2021/0403672 A1 Dec. 30, 2021

(30) Foreign Application Priority Data
Jun. 30, 2020 (JP) .................................. 2020-112736

(51) Int. Cl.
*C08K 3/40* (2006.01)
*C08F 16/24* (2006.01)
*C08K 3/36* (2006.01)

(52) U.S. Cl.
CPC ............... *C08K 3/40* (2013.01); *C08F 16/24* (2013.01); *C08K 3/36* (2013.01)

(58) Field of Classification Search
CPC .............. C08K 3/40; C08K 3/36; C08F 16/24
USPC ........................................................ 523/222
See application file for complete search history.

(56) References Cited

U.S. PATENT DOCUMENTS 7,159,418 B2 * 1/2007 Matsuo ..................... C03C 3/06
65/17.6
2009/0266591 A1 10/2009 Amou et al.

FOREIGN PATENT DOCUMENTS

| JP | H03-119140 A | 5/1991 |
|---|---|---|
| JP | H05-170483 A | 7/1993 |
| JP | 2004-099377 A | 4/2004 |
| JP | 2009-263569 A | 11/2009 |
| JP | 2013-231694 A | 11/2013 |
| JP | 2016-194044 A | 11/2016 |
| JP | 2017-003429 A | 1/2017 |
| JP | 2021-063320 A | 4/2021 |
| WO | 2014/034268 A1 | 3/2014 |
| WO | 2019049922 A1 | 3/2019 |

OTHER PUBLICATIONS

Nov. 30, 2021 Extended European Search Report issued in European Patent Application No. 21180707.8.
Asano, Hitoshi, "Change in OH Group Concentration in Silica Glass Accompanying Heat Treatment", Master's Program, Graduate School of Engineering, University Department of Applied Physics, Department of Molecular S, Feb. 2011, pp. 1-68.
Fujii, Kenji, "Structural Change in Silica Glass Block Due to Heat Treatment", Master's Program, Graduate School of Engineering, University of Fukui Department of Applied Physics, Department of Molecular Science, pp. 1-73.
Jul. 4, 2023 Office Action issued in Japanese Patent Application No. 2020-112736.

* cited by examiner

*Primary Examiner* — David T Karst
(74) *Attorney, Agent, or Firm* — Oliff PLC

(57) ABSTRACT

The present invention is a low dielectric resin substrate, which is a composite including an annealed quartz glass cloth and an organic resin, where the annealed quartz glass cloth has a dielectric loss tangent of less than 0.0010 at 10 GHz, and tensile strength of 1.0 N/25 mm or more per cloth weight (g/m$^2$). This provides a resin substrate that includes a quartz glass cloth which has a low dielectric loss tangent and which is also excellent in tensile strength.

10 Claims, No Drawings

LOW DIELECTRIC RESIN SUBSTRATE

TECHNICAL FIELD

The present invention relates to a low dielectric resin substrate.

BACKGROUND ART

With the development of high-speed communication, such as 5G, substrates for high-speed communication and antenna substrates have been strongly desired, the substrates having little transmission loss even when using a high frequency such as a millimeter wave. In addition, in information terminals such as smartphones, circuit boards have come to have high density mounting and to be extremely thin with remarkable progress.

A laminated plate for such a high-speed communication is widely used today. The laminated plate is achieved by laminating prepregs and curing under heat and pressure. The prepregs are obtained by impregnating a low dielectric glass cloth, such as D glass, NE glass, and L glass, with a resin that includes a thermoplastic resin such as a fluorine resin or polyphenylene ether, and further includes a thermosetting resin such as a low dielectric epoxy resin or a low dielectric maleimide resin. Glass cloths with improved dielectric characteristics such as D glass, NE glass, and L glass are suggested. However, each glass has large dielectric loss tangent of about 0.002 to 0.005 in a high frequency region of 10 G or more. When using a high frequency such as millimeter waves for communication, transmission loss becomes large, and it becomes difficult to transmit accurate information.

Note that it is known that a material having a smaller dielectric constant ($\varepsilon$) and dielectric loss tangent (tan $\delta$) has a more improved transmission loss of a signal, as shown by the Edward A. Wolff formula:

transmission loss~(is proportional to)$\sqrt{\varepsilon}$×tan $\delta$.

In order to achieve a low dielectric loss tangent in an organic resin substrate such as a printed circuit board, a common method is to use an inorganic powder or a glass cloth each having a lower dielectric loss tangent than the resin. However, hardly any inorganic powders or glass cloths with a dielectric loss tangent of less than 0.0010 and also a dielectric constant of 4.0 or less in a high frequency region are known.

Silica powder is a typical and widely used inorganic powder for adding in resin, and quartz glass cloth is used as reinforcement for substrates. These have a small expansion coefficient, and are also materials excellent in insulation and dielectric characteristics.

Generally, quartz glass cloth is known to have extremely excellent dielectric characteristics. However, currently available quartz glass cloths have a dielectric loss tangent of 0.0010 or more at 10 GHz. Meanwhile, regarding silica powder, there are various manufacturing methods, and dielectric loss tangent varies considerably from more than 0.0005 to 0.005 at 10 GHz depending on the manufacturing method. Quartz glass cloth or silica powder having a dielectric loss tangent of less than 0.0005, being close to the intrinsic level of quartz is unavailable.

CITATION LIST

Patent Literature

Patent Document 1: JP H5-170483 A

Non Patent Literature

Non Patent Document 1: Netsu shori ni tomonau shirika garasu chu no OH ki noudo henka (Change in OH Group Concentration in Silica Glass Accompanying Heat Treatment) February, 2011, University of Fukui, Graduate School of Engineering, Thesis for Master's Program Non Patent Document 2: Shirika garasu burokku no netsu shori niyoru kouzou henka (Structural Change in Silica Glass Block Due to Heat Treatment) February, 2005, University of Fukui, Graduate School of Engineering, Thesis for Master's Program

SUMMARY OF INVENTION

Technical Problem

In Patent Document 1, a silica glass fiber manufactured by a sol-gel method is heat-treated to manufacture a silica glass fiber with a water content of 1000 ppm or less. An example of a printed substrate using this silica glass and a fluorine resin (PTFE) is disclosed. However, this silica glass is only heat-treated, and is not etched, and is completely different from the annealed quartz glass used for cloth in the present invention. This is also clear from the following points.

Firstly, in Patent Document 1, there is reference to the water content of the quartz glass fiber after the heat treatment, but there is no mention of the silanol group (Si—OH) amount or the dielectric loss tangent. Since the quartz glass fiber is manufactured by a sol-gel method, the water adhered to the gel and the silanol groups are not separated.

Secondly, in Patent Document 1, although a diffused reflection IR method is adopted, the influence of coexisting water is not taken into consideration, and the water amount is determined from only the peak of silanol at 3660 cm$^{-1}$, and the water amount and the silanol amount contained in the silica glass are not distinguished, that is, the OH derived from $H_2O$ is indistinguishable from the OH in silanol.

Thirdly, Patent Document 1 describes the relation between the water amount in a quartz glass fiber, and dielectric loss tangent. However, the document contains no mention of the silanol amount, and shows only the value of the dielectric loss tangent measured for a printed substrate including a quartz glass fiber and PTFE, and therefore, the correlation between the silanol amount and the dielectric loss tangent of the glass fiber is unclear.

Fourthly, it is disclosed that if baking is performed at 1200° C. or higher, yarn strength (tensile strength) suddenly drops, but there is no description regarding strength recovery.

It is generally known that an amount of hydroxy group (OH group) remaining in a quartz glass varies depending on manufacturing method and heat treatment, and that the difference in OH concentration brings difference in various physical properties to the quartz glass (Non Patent Document 1). However, improving dielectric loss tangent by subjecting a quartz glass cloth or a silica powder obtained by a method other than the sol-gel method to a high-temperature treatment is not known. In addition, it is known that a quartz glass or a silica powder subjected to a high-temperature treatment has increased distortion in the surface layer (Non Patent Document 2). However, there is no mention at all in Patent Document 1 that distortion occurs in the surface layer of the silica glass obtained through the high-temperature heat treatment.

The strength of a quartz glass cloth after a heat treatment, if measured, is considerably degraded due to the distortion on the surface. Therefore, resin substrates that use heat-treated quartz glass cloth or silica powder have not been put to practical use yet.

As described, conventional technology is unable to provide quartz glass cloth having a dielectric loss tangent close to the intrinsic level of quartz. This causes some problems that even when using an organic resin with a low dielectric loss tangent, it is not sufficient for the organic resin substrate itself to achieve a low dielectric loss tangent, and it is difficult to fabricate an ideal substrate with very little transmission loss in high-speed communication that uses millimeter waves, etc.

The present invention has been made to solve the above-described problems, and an object thereof is to provide a resin substrate that includes a quartz glass cloth which has a low dielectric loss tangent and which is also excellent in tensile strength.

Solution to Problem

To solve the above-described problems, the present invention provides a low dielectric resin substrate, which is a composite comprising an annealed quartz glass cloth and an organic resin, wherein the annealed quartz glass cloth has a dielectric loss tangent of less than 0.0010 at 10 GHz, and tensile strength of 1.0 N/25 mm or more per cloth weight (g/m$^2$).

Such a low dielectric resin substrate of the present invention can provide a resin substrate that includes an annealed quartz glass cloth with a low dielectric loss tangent and excellent in tensile strength.

In this case, the low dielectric resin substrate preferably further comprises a silica powder having a dielectric loss tangent of less than 0.0010 at 10 GHz, and an average particle size of 0.1 to 30 μm.

Such a low dielectric resin substrate can remarkably improve its dielectric characteristics while adjusting the expansion coefficient, modulus of elasticity, and so forth of the substrate, since the silica powder to be loaded itself also has a low dielectric loss tangent.

In the present invention, the organic resin is preferably a thermoplastic resin, and more preferably, the thermoplastic resin is one or more thermoplastic resins selected from polyphenylene ether, polyether ether ketone, polyether ketone, polyether sulfone, and fluorine resin.

In addition, in the present invention, the organic resin is also preferably a thermosetting resin, and more preferably, the thermosetting resin is one or more thermosetting resins selected from epoxy resin, allylated epoxy resin, allylated polyphenylene ether resin, maleimide resin, bismaleimide resin, cyanate resin, and cyclopentadiene-styrene copolymer resin.

In the inventive low dielectric resin substrate, the above-described resins can be suitably used as the organic resin to be compounded with the annealed quartz glass cloth.

Advantageous Effects of Invention

As described above, the inventive low dielectric resin substrate can provide a resin substrate that includes an annealed quartz glass cloth having a low dielectric loss tangent and excellent in tensile strength. Furthermore, a silica powder having a dielectric loss tangent of less than 0.0010 at 10 GHz and an average particle size of 0.1 to 30 μm can be used to adjust the expansion coefficient and modulus of elasticity, etc. of the substrate, and the silica powder can achieve a resin substrate with remarkably improved dielectric characteristics. In addition, in the present invention, quartz glass cloth itself to be used has a low dielectric loss tangent and is also excellent in tensile strength, and therefore, choices of organic resins that can be used in combination become wider. The inventive low dielectric resin substrate has a low dielectric loss tangent and is excellent in tensile strength. This can be used suitably for high-speed communication substrates, antenna substrates, etc. with little transmission loss even when using high-frequency waves such as millimeter waves. In addition, the inventive low dielectric resin substrate is also compatible with achieving high density mounting and extreme thinness of circuit boards, and has a high utility value in the field of high-speed communication such as 5G.

DESCRIPTION OF EMBODIMENTS

If the dielectric characteristics, in particular, dielectric loss tangent of existing quartz glass cloth and silica powder can be lowered to the intrinsic level of quartz glass, quartz glass cloth and silica powder can be developed for a wide variety of uses. This includes use as encapsulants for semiconductors for high-speed communication and the like, and as reinforcement or fillers for substrates for high-speed communication, antenna substrates, and the like. These are expected to be greatly developed hereafter.

The present inventors have conducted a study on achieving low dielectricity, and found out the following: heating a quartz glass cloth or a silica powder at a temperature of 500° C. to 1500° C. is effective for lowering the dielectric loss tangent; slightly etching a surface of annealed quartz glass cloth or annealed silica powder that is annealed in this manner enable the surface of the annealed glass cloth or annealed powder to become hard to improve the adhesion with resin; and further, in the annealed quartz glass cloth, the tensile strength of the cloth is greatly improved. Thus, the present invention has been completed.

That is, the present invention is a low dielectric resin substrate, which is a composite including an annealed quartz glass cloth heat-treated at 500° C. to 1500° C. and an organic resin, where the annealed quartz glass cloth has a dielectric loss tangent of less than 0.0010 at 10 GHz, and tensile strength of 1.0 N/25 mm or more per cloth weight (g/m$^2$).

Furthermore, the present inventors have also found out that a low dielectric resin substrate which is a composite including an annealed quartz glass cloth and an organic resin can contain a silica powder having an average particle size of 0.1 to 30 μm and a dielectric loss tangent of less than 0.0010 at 10 GHz to adjust the expansion coefficient and modulus of elasticity, etc. of a substrate, and that a resin substrate with remarkably improved dielectric characteristics can be obtained.

Hereinafter, the present invention will be described in detail, but the present invention is not limited thereto.

The present invention relates to a low dielectric resin substrate that uses an annealed quartz glass cloth with a low dielectric loss tangent and excellent in dielectric characteristics and mechanical strength such as tensile strength. By using the inventive low dielectric resin substrate, an ideal substrate with very little transmission loss in high-speed communication using millimeter waves or the like can be fabricated.

The inventive low dielectric resin substrate is a composite including (A) an annealed quartz glass cloth having a dielectric loss tangent of less than 0.0010 at 10 GHz and tensile strength of 1.0 N/25 mm or more per cloth weight (g/m$^2$), and (B) an organic resin. An additive such as (C) a filler or a coupling agent can be further contained as necessary. Here, "composite" means a thing made up of the glass cloth and the organic resin which are united and inseparable, and specifically, refers to a thing in a state where the annealed quartz glass cloth is buried in the organic resin. Examples of such resin substrates include: a resin substrate obtained by curing a prepreg that is obtained from an annealed quartz glass cloth impregnated with an organic resin; and a resin substrate obtained by sandwiching an annealed quartz glass cloth with thermoplastic resin and hot-pressing.

Hereinafter, the low dielectric resin substrate will be described in detail.

[(A) Annealed Quartz Glass Cloth]

The annealed quartz glass cloth used in the present invention is a heat-treated (at 500 to 1500° C.) quartz glass cloth. This has a dielectric loss tangent of less than 0.0010 at 10 GHz, preferably a dielectric loss tangent of 0.0008 or less, more preferably 0.0005 or less, further preferably 0.0002 or less, and this has tensile strength of 1.0 N/25 mm or more per cloth weight (g/m$^2$), and preferably 1.2 N/25 mm or more per cloth weight (g/m$^2$).

Note that in the present invention, an annealed quartz glass cloth refers to a heat-treated quartz glass cloth in which a quartz glass cloth is subjected to a heat treatment at 500° C. or higher and 1500° C. or lower, and the quartz glass cloth itself is specially heat-treated as described here. Therefore, an annealed quartz glass differs clearly from a quartz glass, such as a so-called fused quartz glass or a quartz glass obtained by high-temperature treating a sol-gel processed silica, obtained through a high-temperature treatment which is performed during the manufacturing process of the quartz glass itself.

In addition, as described below, the dielectric loss tangent can be measured using SPDR (Split post dielectric resonators) for measuring dielectric constant at a frequency of 10 GHz, and the tensile strength is measured in accordance with "7.4 tensile strength" of "Testing methods for textile glass products" of JIS R3420: 2013.

<Quartz Glass Cloth>

As the material of the quartz glass cloth to be used in the present invention, a naturally produced quartz with little impurity or a synthetic quartz made from raw materials of silicon tetrachloride or the like, can be mainly used.

The above quartz glass material preferably has a SiO$_2$ content of 99 mass % or more, more preferably 99.5 mass % or more. With such a SiO$_2$ content, the heat-treated quartz glass cloth can be easily given a low dielectric loss tangent of the intrinsic level of quartz.

The impurity concentration in the quartz glass material is more preferably as follows: a sum total of alkali metal such as Na, K, and Li, of 10 ppm or less; 1 ppm or less of B; 1 ppm or less of P; and to preent malfunction due to radiation, U and Th contents of 0.1 ppb or less each.

The quartz glass cloth can be manufactured by producing a filament or yarn from a quartz ingot obtained in the following manner as the raw material and weaving.

A quartz ingot can be manufactured by an electric melting method or a flame-fusion method with naturally produced quartz as a raw material; a direct synthesis method, a plasma synthesis method, or a soot method with silicon tetrachloride as a raw material; or a sol-gel method with alkyl silicate as a raw material; or the like.

For example, a quartz yarn with a diameter of 100 to 300 μm to be used in the present invention can be manufactured by melting an ingot at 1700 to 2300° C., extending, and winding.

Note that in the present description, the thin thread-like filament obtained by extending a quartz yarn as described above is defined as a quartz glass filament, bundled quartz glass filaments as a quartz glass strand, and bundled and further twisted quartz glass filaments as a quartz glass yarn.

In the case of a quartz glass filament, the diameter thereof is preferably 3 μm to 20 μm, more preferably 3.5 μm to 9 μm. Methods for manufacturing a quartz glass filament include the above-described extending methods and the like by electric melting and oxyhydrogen flame using quartz yarn. However, the manufacturing methods are not limited thereto as long as the quartz glass filament diameter is 3 μm to 20 μm.

A quartz glass strand is preferably manufactured by bundling 10 to 400 of the quartz glass filaments, more preferably 40 to 200.

Furthermore, the quartz glass cloth to be used in the present invention can be manufactured by weaving the above-described quartz glass yarn or strand.

In the present invention, the twisting number of the quartz glass yarn is not particularly limited, but when the twisting number is small, the thickness of the cloth can be made thin easily in the opening process after forming a glass cloth, and air permeability can be easily lowered. Meanwhile, when the twisting number is large, the convergence of yarn becomes raised, and breakage and fuzz do not easily occur.

The quartz glass yarn is woven into a glass cloth with the warp and weft count (density) each 10/25 mm or more, preferably 30/25 mm or more, more preferably 50/25 mm or more, and 120/25 mm or less, preferably 110/25 mm or less, and more preferably 100/25 mm or less.

There is no particular restriction to the method for weaving a quartz glass cloth, and examples include weaving by a rapier loom, a shuttle loom, and an air jet loom.

Generally, when manufacturing a cloth, a yarn having the filament surface coated with a sizing agent whose main component of the coating agent is starch is used for weaving with, in order to prevent the yarn becoming fuzzy or breaking.

As the sizing agent, components other than starch such as a cationic vinyl acetate copolymer emulsion can be contained. Examples of the other components include a lubricant, an emulsifier, a cationic softener, an antistatic agent, a silane coupling agent, an antiseptic. In addition, a small amount of alcohol such as methanol, ethanol, and isopropanol or other organic solvents can be added to the sizing agent for the quartz glass fiber of the present invention.

Furthermore, flattening a glass cloth in a state of having an organic matter that shows characteristics of a lubricant adhered to the glass yarn, or a glass cloth in a state of having a binder or sizing material, etc. that is used when weaving an ordinary glass cloth adhered (gray fabric), or performing a flattening process combining these techniques has a great effect of reducing the thickness of the glass cloth. This is therefore preferable, since the amount of glass that can be loaded can be increased without making the thickness of the glass cloth thicker. In addition, by performing a surface treatment after performing an opening treatment, and further performing an opening treatment, the spaces between the sized filaments can be further expanded.

Here, when the yarn bundles become widened by the opening, the impregnating ability of the resin varnish is improved. Therefore, there is also an advantage that the glass and matrix resin become more uniform, and heat resistance, etc. are improved. In addition, this is favorable since there is an advantage that the distribution of glass yarn becomes uniform, so that laser workability (uniformity of hole diameter distribution, processing speed, etc.) is improved.

As methods for removing the sizing agent, etc. after weaving, ordinary methods such as dissolving with a solution or baking off by heating or the like can be considered. However, a method of using a sizing agent made with a water-soluble fiber and dissolving and removing with hot water is particularly preferable. By this method, not only is the sizing agent removed, the filaments of the strands forming the glass cloth become a spread-out state, that is, opening takes place. Furthermore, unexpectedly, the presence of small spaces that appear when the sizing agent is removed causes the spread-out filaments to become wavy. Therefore, density is comparatively uniform even though the weight and the number of filaments are small, and a smooth cloth with small unevenness on the surface can be obtained.

In a case where heat cleaning such as a heat treatment is performed after weaving, removal can be performed by keeping at a temperature of 200° C. or higher and lower than 500° C. for 24 hours to 100 hours.

The tensile strength of the quartz glass cloth in this state is 1.0 N/25 mm or more per cloth weight (g/m$^2$), and is sufficiently at a level where problems do not occur in handling in the subsequent step.

Currently available quartz glass cloths that can be obtained by this kind of manufacturing method have better dielectric characteristics than LE glass or the like known as low dielectric glass. However, the dielectric loss tangent is 0.0010 or more, which is a value one digit greater than the dielectric loss tangent 0.0001 that quartz intrinsically possesses.

The present inventors have found out that an annealed quartz glass cloth, which is a quartz glass cloth subjected to a high-temperature treatment at a temperature of 500° C. or higher, and which then has a strained layer on the surface of the fibers configuring the cloth removed, becomes a quartz glass cloth that has a dielectric loss tangent of less than 0.0010 in a high frequency region at 10 GHz, and tensile strength of 1.0 N/25 mm or more per cloth weight (g/m$^2$), and that by using this annealed quartz glass cloth, a resin substrate excellent in dielectric characteristics can be manufactured.

According to IPC-4412B (Appendix II), cloth weight (g/m$^2$) and cloth thickness (mm) vary depending on cloth type, and the cloth weight (g/m$^2$) is within the range of 9 to 270 (g/m$^2$), and the cloth thickness (mm) is within the range of 0.011 to 0.260 (mm). Since the tensile strength (N/25 mm) of cloth also varies depending on the cloth type, the tensile strength of a quartz glass cloth has been defined as a value obtained by dividing the measured value of the tensile strength (N/25 mm) by the cloth weight (g/m$^2$) as shown in the following expression (1):

$$\text{Tensile strength (N/25 mm)} \div \text{cloth weight (g/m}^2\text{)} \geq 1.0 \quad (1)$$

<Method for Producing Annealed Quartz Glass Cloth>

In the present invention, the above-described quartz glass cloth is heat-treated at a high temperature to remove the silanol groups present in the quartz glass, then the strained layer generated on the quartz glass surface is dissolved and removed, and the quartz glass surface may be treated with a coupling agent or the like as necessary to give an annealed quartz glass cloth (low dielectric quartz glass cloth), and this annealed quartz glass cloth is used.

Furthermore, the above-described annealed quartz glass cloth preferably has a SiO$_2$ content of 99 mass % or more, more preferably 99.5 mass % or more.

(Heat Treatment Step)

Regarding the heating temperature at which the silanol groups in the quartz glass are removed, the quartz glass cloth is heat-treated at a temperature of 500° C. to 1500° C., preferably 500° C. to 1300° C., more preferably 700° C. to 1000° C. As the heating method, it is possible to wrap the weaved quartz glass cloth around a quartz pipe or a metal pipe and place in an electric heating furnace, a muffle furnace, or the like, and heat-treat at the above-described temperature. However, the heating method and the form of the quartz glass cloth to be treated are not limited thereto.

The heat treatment time of the quartz glass cloth varies depending on the heating temperature, and for practicality, is preferably 1 minute to 72 hours, more preferably 10 minutes to 24 hours, and further preferably 1 hour to 12 hours.

Note that the cooling to room temperature after heating can be either slow or rapid. However, depending on conditions, the heating temperature and cooling conditions are preferably optimized since quartz glass in a molten state sometimes partially crystallizes. The heating atmosphere is not particularly limited, and can be in the air or in an inert gas such as nitrogen under normal pressure, or in a vacuum or under reduced pressure. However, heating is usually performed in the air under normal pressure considering cost, etc. The degree of decrease in the silanol groups attributable to the heat treatment can be analyzed by infrared spectroscopic analysis or the like to observe whether the desired dielectric characteristics have been reached. By this step, dielectric loss tangent can be made less than 0.0010, preferably 0.0008 or less, more preferably 0.0005 or less, and furthermore, 0.0002 or less, which are close to the intrinsic level of quartz.

As a method for analyzing silanol groups, there is also an analysis method by solid $^{29}$Si-NMR besides the infrared spectroscopic analysis. Solid $^{29}$Si-NMR has an aspect that the analysis operation is complicated and efficiency is poor, but is a favorable analysis method since silanol groups on the quartz glass cloth surface and inside can be quantified.

Here, a reason for removing the silanol groups in the quartz glass will be explained.

It is known that in a GHz band, dipole caused by polarization responds to an electric field, and induced electricity occurs. For this reason, to achieve low dielectric characteristics in a GHz band, it is important to reduce polarizability in a structure.

The dielectric constant is represented by the following Clausius-Mossotti formula, and molecular polarizability and molar volume are factors. Accordingly, reducing polarization, and increasing molar volume are effective in achieving a low dielectric constant.

$$\text{Dielectric constant} = [1 + 2(\Sigma Pm/\Sigma Vm)]/[1-(\Sigma Pm/\Sigma Vm)]$$

(Pm: molecular polarizability of atomic group, Vm: molar volume of atomic group)

In addition, the dielectric loss tangent (tan δ) is a delay in dielectric response to an alternating-current electric field, and in a GHz band, the orientation relaxation of a dipole is the main factor. Accordingly, to reduce dielectric loss tangent, a method of eliminating the dipole (achieving a structure close to being nonpolar) can be considered.

From the above, the present invention aims to suppress the concentration of silanol groups, being polar groups, as an approach to achieving low dielectric characteristics of quartz glass in a GHz band.

From the above viewpoints, the silanol group (Si—OH) concentration in the quartz glass cloth after the heat treatment is preferably 300 ppm or less, preferably 250 ppm or less, and more preferably 100 ppm or less in the present invention. The silanol group concentration in the quartz glass cloth after the heat treatment is preferably low, so that the strained layer on the quartz glass surface can be dissolved and removed in the strength recovery step described below.

In this way, an annealed quartz glass cloth with an even lower dielectric loss tangent can be obtained. The silanol group (Si—OH) concentration in the annealed quartz glass cloth obtained in the end is, as described above, preferably 300 ppm or less, more preferably 250 ppm or less, and further preferably 100 ppm or less.

The silanol concentration in the heat-treated quartz glass cloth and the annealed quartz glass cloth are preferably measured by solid $^{29}$Si-NMR, by which silanol groups on the quartz glass cloth surface and inside can be quantified. In this way, it is possible to determine accurately the silanol concentration that affects dielectric loss tangent. Measurement of the silanol concentration in the quartz glass by solid $^{29}$Si-NMR can be performed by a known method such as a DD (Dipolar Decoupling)/MAS (Magic Angle Spinning) method (see for example, JP 2013-231694 A, JP 2017-3429 A).

By the above-described heat treatment step, the dielectric loss tangent of the quartz glass cloth at 10 GHz can be made to be within the above range.

However, due to the heat treatment at a high temperature, the strength of the quartz glass cloth provided with low dielectricity is considerably lowered to 0.5 (N/25 mm) or less per cloth weight (g/m$^2$). Therefore, the next step, for example, a coupling agent treatment or resin impregnation for manufacturing prepreg cannot be performed in this state, and a quartz glass cloth in this state cannot be put to practical use.

Accordingly, in the present invention, strength recovery of the heat-treated quartz glass cloth is subsequently performed by immersion in an etching solution.

(Strength Recovery Step)

The present strength recovery step is a step of enhancing the tensile strength of the quartz glass by dissolving and removing a strained layer formed on the quartz glass surface during the high-temperature treatment.

The present inventors have studied the degradation of strength after the heat treatment, and found that a slight distortion remains on the surface layer of a quartz glass cloth after heat-treating at a high temperature, that this becomes a starting point for easy breakage, and furthermore, that in order to recover strength, strength can be recovered by removing this strained layer.

The strained layer of the quartz glass cloth can be easily removed by immersing in an etching solution. The etching solution is not particularly limited as long as the strained layer can be removed, and includes an acid aqueous solution such as an aqueous hydrofluoric acid solution, an aqueous ammonium acid fluoride (NH$_4$F.HF) solution, and an aqueous potassium acid fluoride (KHF$_2$) solution; and a basic aqueous solution selected from an aqueous ammonium fluoride solution, an aqueous sodium hydroxide solution, an aqueous potassium hydroxide solution, an aqueous sodium carbonate solution, ammonia water, and alkaline electrolyzed water. From aspects of working environment and wastewater treatment, alkaline electrolyzed water is more preferable.

The etching conditions of the quartz glass cloth after the heat treatment are not particularly limited as long as the strained layer can be removed, but the temperature is preferably room temperature (23° C.) to 100° C., more preferably 40° C. to 80° C. Treatment time depends on the etching speed of the quartz surface on the treatment temperature, and is therefore not particularly limited. The treatment temperature can be room temperature to 90° C., preferably 40° C. to 80° C. The lower the temperature of the etching solution, the less the etching progresses, and the higher the temperature, the faster the etching speed. For practical purposes, a temperature at which the treatment can be completed in 10 minutes or more to 168 hours is preferable. The treatment time is preferably 1 hour to 72 hours, more preferably 10 hours to 24 hours. In addition, under atmospheric pressure or pressurized atmosphere, the treatment can be performed within the ranges of the above temperature and time. The pH of the etching solution is not particularly limited as long as the strained layer can be removed, and can be adjusted by adding an acid or a base, for example, as necessary.

Specifically, as a basic solution, when the pH is 8.0 or higher, the etching effect of the quartz glass is sufficient, and an improvement in tensile strength can be observed, but the pH is preferably 10.0 to 13.5, more preferably 11.0 to 13.0.

As a basic etching solution, a basic aqueous solution with a pH of 11 or higher is preferably used, and more preferably, alkaline electrolyzed water with a pH of 12 or higher is used.

The etching process is not particularly limited as long as the strained layer can be removed, but from the viewpoint of improving the productivity of the annealed quartz glass cloth, the etching treatment is preferably performed as a continuous process. This can be performed in the following manner.

The treatment method is to immerse a roll having a quartz glass cloth wound around a metal pipe, a quartz pipe, etc. directly in an etching tank filled with an etching solution, or to continuously immerse in a plurality of etching tanks filled with different etching solutions. Thus the strained layer can be removed. The treatment method is not limited as long as a predetermined temperature and time are satisfied. A metal pipe or quartz pipe with a hole in the pipe can be used in order to allow smooth infiltration of the etching solution to the wound quartz glass cloth.

In addition, it is also possible to perform the etching treatment by continuously unwinding and pulling out the quartz glass cloth wound around the metal pipe or quartz pipe from the roll, and passing through the above-described etching tank for a predetermined time. For uniform etching, this method is preferable.

To perform the etching smoothly, etching can also be performed with an ultrasonic generator disposed inside the etching tank, and while transmitting ultrasonic waves and providing vibration. This is a favorable method since etching can be performed more uniformly by applying ultrasonic waves.

After the etching treatment, in the above-described roll state or while unwinding and pulling out the quartz glass cloth from the roll continuously, the etched quartz glass cloth is further washed in a washing tank of pure water, ion-exchanged water, etc. at room temperature to 100° C. in order to remove impurities such as alkali metal. In a case where alkaline electrolyzed water is used as the etching solution, the washing step can be omitted.

After washing, it is preferable to heat and dry the water adhered to the quartz glass cloth for sending to the subsequent step such as a coupling agent treatment.

By this strength recovery step, an annealed quartz glass cloth with a low dielectric loss tangent and high tensile strength can be obtained, the dielectric loss tangent being less than 0.0010, and the tensile strength being 1.0 (N/25 mm) or more per cloth weight (g/m$^2$).

(Coupling Agent Treatment Step)

Furthermore, the surface of the quartz glass cloth subjected to the etching treatment and having the water adhered to the quartz glass cloth heated and dried is preferably subjected to a coupling agent treatment.

Coating the surface of the quartz glass cloth with a silane coupling agent in this manner has the effect of raising the sliding properties and wettability of a glass cloth or yarn, and raising the tensile strength of the glass cloth. When the surface of the etched quartz glass cloth is treated with the silane coupling agent, the tensile strength of the quartz glass cloth becomes 1.5 (N/25 mm) or more per cloth weight ($g/m^2$), and when the most suitable silane coupling agent is selected, the tensile strength becomes 2.0 (N/25 mm) or more.

In addition, the surface treatment with the silane coupling agent is performed in order to make the adhesion between resin and the glass cloth surface strong when manufacturing prepreg, etc. After a high-temperature treatment and an etching treatment of the quartz glass cloth, and then cleaning the quartz glass cloth, the surface treatment is performed by coating the surface of the glass cloth with a silane coupling agent. As the silane coupling agent, a known silane coupling agent can be used. Alkoxysilane is preferable, and one or more selected from a group including 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, N-phenyl-3-aminopropyltrimethoxysilane, 3-methacryloxypropyltrimethoxysilane, 3-methacryloxypropyltriethoxysilane, p-styryltrimethoxysilane, and trifluoropropyl trimethoxysilane are more preferable.

The silane coupling agent is usually used as a diluted aqueous solution at a concentration of 0.1 mass % to 5 mass %, but it is particularly effective to use at 0.1 mass % to 1 mass %. By using the annealed quartz glass cloth, the silane coupling agent adheres uniformly, and brings a more uniform protection effect to the glass cloth surface so that handling becomes easy. Moreover, the tensile strength of the quartz glass cloth is enhanced, while at the same time, uniform application without unevenness to resin that is used when fabricating prepreg becomes possible.

[(B) Organic Resin]

The organic resin to be compounded with the annealed quartz glass cloth is not particularly limited, and either of a thermosetting resin or a thermoplastic resin can be used. In addition, resins of each kind can also be used together in mixture.

Typical examples of the thermoplastic resin include polyphenylene ether, polyether ether ketone, polyether ketone, polyether sulfone, and fluorine resin. In particular, fluorine resin is preferable because of low dielectric characteristics. As the fluorine resin, at least one selected from the group including polytetrafluoroethylene [PTFE], polychlorotrifluoroethylene [PCTFE], ethylene [Et]-TFE copolymer [ETFE], Et-chlorotrifluoroethylene [CTFE] copolymer, CTFE-TFE copolymer, TFE-HFP copolymer [FEP], TEE-PAVE copolymer [PFA], and polyvinylidene fluoride [PVdF] is preferable.

Examples of the thermosetting resin include epoxy resin, allylated epoxy resin, allylated polyphenylene ether resin, maleimide resin, bismaleimide resin, cyanate resin, and cyclopentadiene-styrene copolymer resin.

In particular, a bismaleimide resin represented by the following general formula (1) is used suitably for achieving low dielectricity.

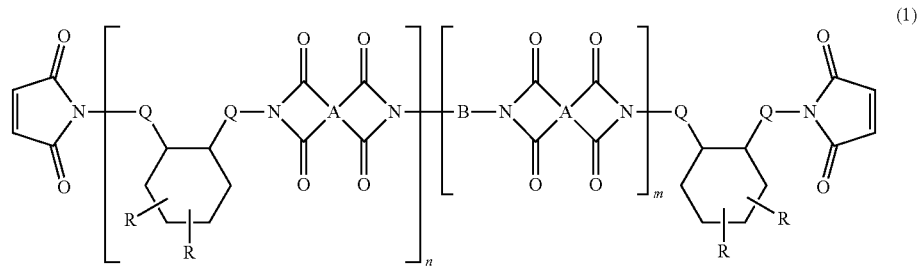

(1)

In the formula, A independently represents a tetravalent organic group including an aromatic ring or an aliphatic ring. B represents an alkylene chain having 6 to 18 carbon atoms and having an aliphatic ring that may contain a divalent heteroatom. Q independently represents a linear alkylene group having 6 or more carbon atoms. R independently represents a linear or branched alkyl group having 6 or more carbon atoms. "n" represents a number of 1 to 10. "m" represents a number of 0 to 10.

Typical bismaleimide resins include the SLK-2000 series (manufactured by Shin-Etsu Chemical Co., Ltd.), SLK-6895 (manufactured by Shin-Etsu Chemical Co., Ltd.), SLK-3000 (manufactured by Shin-Etsu Chemical Co., Ltd.), and the like. In addition, a thermosetting cyclopentadiene-styrene copolymer resin can also be used as a high heat resistance resin. Typical examples include the SLK-250 series (manufactured by Shin-Etsu Chemical Co., Ltd.).

[(C) Filler]

In the present invention, a filler can be contained as necessary. As the filler, a known filler such as silica can be used, and the following low dielectric silica powder is preferable. When a filler is contained, the expansion coefficient and modulus of elasticity and so forth of the substrate are adjustable, and dielectric characteristics are also adjustable.

(Low Dielectric Silica Powder)

Silica powder that can be used for the present invention has an average particle size of 0.1 to 30 μm, and preferably a dielectric loss tangent of less than 0.0010 at 10 GHz, more preferably 0.0005 or less. The silica powder preferably contains, inside and on a part of the surface or the entire surface, 200 ppm or less of a metal and/or an oxide thereof in terms of metal, the metal selected from aluminum, magnesium, and titanium, and the contained amounts of alkali metal and alkaline earth metal are preferably 10 ppm or less each.

Note that in the present invention, the maximum particle size and the average particle size can be measured by a laser diffraction type particle size distribution measurement apparatus (for example, SALD-3100 manufactured by Shimadzu Co., etc.), and the average particle size can be determined as a mass-average value D50 (that is, a median diameter or a particle size when a cumulative mass is 50%) in the particle size distribution measurement by a laser diffraction method.

Furthermore, the above-described silica powder with 1 ppm or less of B, 1 ppm or less of P, and U and Th contents of 0.1 ppb or less each can also be used as a low dielectric silica powder. Silica powder that can be favorably used in the present invention is a low dielectric silica powder which is provided with low dielectricity by heat-treating at a temperature of 500° C. to 1500° C., and which further has the surface of the silica powder etched with a basic aqueous solution, further preferably with alkaline electrolyzed water having a pH of 12 or higher.

A silica powder that is preferable in the present invention has a silanol group (Si—OH) content of 300 ppm or less, and when the content is less than this, the dielectric loss tangent becomes sufficiently low. By the above-described heat treatment, the silanol group amount contained in the silica powder becomes 300 ppm or less, preferably 280 ppm or less, further preferably 150 ppm or less, and a silica powder having characteristics of a low dielectric loss tangent is achieved.

A low dielectric silica powder that is favorably used in the present invention is a silica powder that has an average particle size of 0.1 to 30 µm, preferably a maximum particle size of 100 µm or less, and when used as a filler of a substrate for high-speed communication, an average particle size of 0.1 to 5 µm and a maximum particle size of 20 µm, more preferably an average particle size of 0.1 to 3 µm and a maximum particle size of 10 µm or less.

The silica powder can be provided with a dielectric loss tangent of less than 0.0010, preferably 0.0005 or less, more preferably 0.0004 or less at 10 GHz by heat-treating at a temperature of 500° C. to 1500° C.

When a silica powder is heat-treated at a temperature of 500° C. or higher, a strained layer is sometimes formed on the particle surface and strength is degraded. Therefore, as a silica powder to be used in the present invention, a silica powder with this strained layer removed is preferably used. Regarding the removal of the strained layer of the silica powder, the strained layer can be easily removed by immersing the silica powder in an etching solution or the like in the same manner as the quartz glass cloth described above.

Furthermore, by coating the surface of the silica powder with a silane coupling agent or the like, the adhesion between resin and the surface of the glass cloth or silica powder can be made strong when manufacturing prepreg.

As the silane coupling agent, a known silane coupling agent used on the quartz glass cloth described above can be used.

The amount of silica powder to be added is preferably 0 to 1000 parts by mass, more preferably 10 to 950 parts by mass, particularly preferably 50 to 850 parts by mass, relative to 100 parts by mass of a sum total of the resin component. Silica powder does not need to be added depending on the type of organic resin and use, but sometimes, the coefficient of thermal expansion (CTE) of the cured material becomes large, and sufficient strength cannot be achieved. When 1000 parts by mass or less is added, loss of flexibility or poor appearance do not occur when manufacturing prepreg. Note that when blending a small amount is sufficient, this silica powder is preferably contained within the range of 10 to 90 mass %, in particular, 35 to 85 mass % of the total resin.

This silica powder is suitable as a filler for substrates such as a high-speed communication substrate or an antenna substrate when used together with the above-described quartz glass cloth.

The above-described silica powder can have silica powders of different average particle sizes blended in order to enhance properties such as flowability and workability.

[Other Components]

To the inventive low dielectric resin substrate, the above-described silane coupling agent and, according to necessity, optional components such as an acid, a dye, a pigment, a surfactant, a flame retardant, or an adhesive aid can be added in addition to the components (A) to (C).

[Low Dielectric Resin Substrate]

The following embodiments from first to third can be given as the inventive low dielectric resin substrate, but the present invention is not limited thereto.

The first embodiment provides a resin substrate formed by heating a prepreg of a glass cloth under pressure, where the annealed quartz glass cloth with a low dielectric loss tangent is impregnated with resin to give the prepreg of the glass cloth.

The second embodiment provides a resin substrate obtained by heating the annealed quartz glass cloth and an organic resin under pressure to form a composite.

The third embodiment provides a resin substrate formed by heating a prepreg of a glass cloth under pressure to form a composite, where the annealed quartz glass cloth is impregnated with a resin containing silica powder having a low dielectric loss tangent to give the prepreg of the glass cloth.

Furthermore, the present invention is related to circuit board materials having a low dielectric loss tangent such as prepreg and laminated plates, and is further related to circuit board materials such as multilayer printed substrates and printed substrates which have a low dielectric constant and a low dielectric loss tangent, and are excellent in transmission properties of high-frequency signals, and resin compositions, prepreg, and laminated plates used for manufacturing the substrates.

The inventive low dielectric resin substrate (organic resin substrate) contains the above-described components (A) and (B) as essential components. The component (C) is an optional component, but is preferably loaded from viewpoints of controlling the coefficient of thermal expansion of the organic resin and strength. When the component (C) is contained, a fabricated organic resin prepreg can provide a substrate (laminated substrate). The low dielectric resin substrate can be an organic resin laminate substrate or an organic resin metal-clad laminate substrate depending on usage. In the inventive low dielectric resin substrate, the thickness of an insulating layer can be selected appropriately depending on usage and so forth, and is not particularly limited, but is preferably 20 to 2,000 µm, more preferably 50 to 1,000 µm.

—Method for Manufacturing Low Dielectric Resin Substrate—

The inventive low dielectric resin substrate can be manufactured in the usual manner using the above-described components (A) and (B), and according to necessity, other components such as the component (C).

When an organic resin (matrix resin) is soluble/dispersible in a solvent, an organic resin composition containing components other than the component (A) can be prepared, and this can provide a prepreg. Then, the prepreg can be cured by heating under pressure to obtain a low dielectric resin substrate (first production method). When the organic resin is not soluble/dispersible in a solvent, or when it is difficult to dissolve the organic resin, a low dielectric resin substrate can also be fabricated by thermocompression-bonding a thin film of an organic resin film, an annealed quartz glass cloth, and according to necessity, a copper foil, etc. (second production method). Hereinafter, these production methods will be described.

(First Production Method)

In the first production method, the inventive low dielectric resin substrate can be obtained in the following manner. An organic resin composition containing the above-described (B), and as necessary, the component (C) is dissolved/dispersed in a solvent, and an annealed quartz glass cloth, being the component (A), is impregnated with the organic resin composition in this state. Next, the solvent is removed from the impregnated glass cloth by evaporation to give a prepreg. This prepreg is cured by heating under pressure, etc. Here, the content of the component (C) filler (inorganic filler, etc.) is preferably 1000 parts by mass or less, more preferably 10 to 950 parts by mass, and particularly preferably 50 to 850 parts by mass relative to 100 parts by mass of the component (B).

—Solvent—

When a low dielectric resin substrate is manufactured by the first production method, the solvent is not particularly limited as long as it can dissolved/dispersed the above-described organic resin composition, and the solvent can be made to evaporate at a temperature at which the composition can be maintained in an uncured or semi-cured state. Examples include solvents with a boiling point of 50 to 200° C., preferably 80 to 150° C. Specific examples of the solvent include: hydrocarbonic non-polar solvents such as toluene, xylene, hexane, and heptane; and hydrocarbonic polar solvents such as ethers and esters. The amount of solvent to be used is not particularly limited as long as the above-described organic resin composition can dissolve or disperse and the annealed quartz glass cloth can be impregnated with the obtained solution or dispersion with the amount, and the amount is preferably 10 to 200 parts by mass, more preferably 20 to 100 parts by mass relative to 100 parts by mass of the organic resin composition.

The organic resin composition can be prepared in the following manner, for example.

Firstly, components soluble in an organic solvent such as organic resin, and in some cases additives such as a cross-linking agent, a reaction initiator, etc. are added into an organic solvent and dissolved. In this event, the mixture may be heated as necessary. Subsequently, components insoluble in an organic solvent such as an inorganic filler and so forth are added to the mixture, and using a ball mill, a bead mill, a planetary mixer, a roll mill, or the like, these are dispersed until a predetermined dispersion state is achieved to prepare a varnish-form resin composition.

Alternatively, an inorganic filler is mixed and dispersed in an organic resin using a disperser such as a planetary mixer, or a roll mill. Subsequently, with a dissolving apparatus such as a ball mill, a bead mill, or a stirring apparatus manufactured by Satake Chemical Equipment Mfg., Ltd., the organic resin mixture, a crosslinking agent, a reaction initiator, and so forth are added to an organic solvent to prepare a varnish-form resin composition.

In addition, when blending, it is also favorable to perform a pre-treatment on the inorganic filler with a surface treatment agent such as a silane coupling agent or a titanate coupling agent, a silicone oligomer, or the like, or perform an integral blend treatment with the surface treatment agent. Note that, instead of performing a surface treatment on the glass cloth beforehand, it is also possible to have a surface treatment agent (silane coupling agent, etc.) blended in the organic resin composition.

The resin composition content in the varnish obtained in the end is preferably 30 to 90 mass %, more preferably 40 to 80 mass %, and further preferably 50 to 70 mass % of the entire varnish. When the resin composition content in the varnish is 30 to 90 mass %, applicability can be kept favorable, and a prepreg with a suitable amount of resin composition adhered can be obtained.

—Prepreg—

The above-described solution or dispersion (varnish) of the organic resin composition provides a prepreg (organic resin prepreg). For example, the annealed quartz glass cloth is impregnated with the solution or dispersion, or the solution or dispersion is applied to the annealed quartz glass cloth by spraying, extrusion, or the like. Subsequently, the solvent is removed in a drying furnace preferably at 50 to 150° C., more preferably 60 to 120° C., and the resultant is semi-cured (B-staging) to obtain a prepreg (organic resin prepreg). Note that the method for impregnating the annealed quartz glass cloth with the organic resin composition is not limited to the above, and a common method can be applied. It is also possible to obtain a prepreg while still in the state before curing (A-stage), after impregnating the annealed quartz glass cloth with the organic resin.

In this manner, a prepreg which is thin, has a low dielectric constant, and in which an improvement has been made in insulation reliability can be obtained.

The resin content in the prepreg is not particularly limited, but is, for example, preferably 40 to 90 mass %, more preferably 50 to 90 mass %, and further preferably 60 to 80 mass %., With such a resin content, the desired low dielectric characteristics can be achieved, and in addition, coefficient of thermal expansion (CTE) does not become high, and plate thickness precision does not become degraded either. Note that the resin content referred to here is the ratio of the mass obtained by subtracting the mass of the glass cloth from the mass of the prepreg to the mass of the prepreg; that is, resin content=("mass of prepreg"−"mass of glass cloth")/"mass of prepreg"×100.

The obtained prepreg can be superimposed so that the number of superimposed prepregs is in accordance with the thickness of the insulating layer, and this can be heated under pressure to obtain a laminate substrate. A metal foil is superimposed on the prepreg, and is heated under pressure by using a vacuum press or the like at a pressure of 5 to 50 MPa and a temperature of 70 to 180° C. to manufacture a metal-clad laminate substrate. The metal foil is not particularly limited, but a copper foil is preferably used in view of electricity and economy. Processing this metal-clad laminated plate by normally used methods such as a subtractive method and drilling can provide a printed circuit board.

(Second Production Method)

In the case of a thermoplastic resin which is difficult to dissolve in a solvent, a resin substrate can also be fabricated by thermocompression-bonding a thin resin film, a copper foil, and an annealed quartz glass cloth.

For example, when fabricating a fluorine resin substrate, there is a method of compressing an already molded and surface-treated fluorine resin film, an annealed quartz glass cloth, and a copper foil under heating. Thermocompression-bonding under heating can normally be performed at 250 to 400° C. for 1 to 20 minutes under a pressure of 0.1 to 10 MPa. Regarding the thermocompression-bonding temperature, there are concerns for seeping of resin and loss of uniformity in thickness occurring when the temperature is high, and the temperature is preferably lower than 340° C., and more preferably 330° C. or lower. Thermocompression-bonding can also be performed in batches by using a press, and can also be performed continuously by using a high-temperature laminator. When a press is used, a vacuum press is preferably used in order to prevent sandwiching of air and to make it easier for the fluorine resin to get inside the annealed quartz glass cloth.

A fluorine resin film subjected to a surface treatment cannot adhere sufficiently to a copper foil with low surface roughness on its own, and seeps from the copper foil during thermocompression-bonding, and thickness cannot be made uniform either. However, as described above, when compounded with an annealed quartz glass cloth, linear expansion coefficient becomes sufficiently lowered, furthermore, seeping of the resin is also reduced, and high adhesion is exhibited even with a copper foil with a surface roughness Ra of less than 0.2 µm.

The structure of the laminate includes two sheets of copper foil and in between, "n" sheets of fluorine resin film and "n–1" sheets of annealed quartz glass cloth laminated alternately ("n" is an integer of 2 to 10). The value of "n" is preferably 8 or less, and further preferably 6 or less. By changing the thickness of the fluorine resin film, the type of the annealed quartz glass cloth, and the value of "n", the linear expansion coefficient of the resin laminate substrate of the present invention in X and Y directions can be changed. The value of the linear expansion coefficient is preferably within the range of 5 to 50 ppm/° C., further preferably 10 to 40 ppm/° C. When the linear expansion coefficient of the dielectric layer exceeds 50 ppm/° C., the adhesiveness between the copper foil and the dielectric layer becomes low, and faults such as warping and waviness of the substrate after etching the copper foil, etc. become liable to occur.

A resin substrate can also be fabricated by loading the component (C) in the above-described thin film of a resin film in advance, and thermocompression-bonding with an annealed quartz glass cloth or the like.

An electrode pattern of the metal-clad laminate substrate can be formed by a known method, for example by etching, etc. a copper-clad laminate substrate having an organic resin laminate substrate of the present invention and a copper foil provided on one or both sides of the laminate substrate.

EXAMPLE

Hereinafter, the present invention will be specifically described with reference to Examples, Comparative Examples, and Preparation Examples. However, the present invention is not limited to the following Examples.

Note that the tensile strength, dielectric loss tangent (tan δ), and average particle size in the following were measured by the following methods.

1. Measurement of tensile strength

Tensile strength was measured in accordance with "7.4 tensile strength" of "Testing methods for textile glass products" of JIS R3420: 2013.

2. Measurement of dielectric loss tangent 2.1 Glass cloth and resin substrate

Unless otherwise stated in particular, dielectric loss tangent was measured using SPDR (Split post dielectric resonators) for measuring dielectric constant dielectric resonator at a frequency of 10 GHz (manufactured by Keysight Technologies).

2.2 Silica powder (1) 100 parts by mass of a silica powder was mixed in 100 parts by mass of an anisole solvent containing 100 parts by mass of SLK-3000 (manufactured by Shin-Etsu Chemical Co., Ltd.), being a low dielectric maleimide resin and as a curing agent, 2.0 parts by mass of dicumyl peroxide (Percumyl D manufactured by NOF Corporation), being a radical polymerization initiator. This was dispersed and dissolved to prepare a varnish. At this time, the silica powder is 33.3% relative to the resin by volume %. In the same manner, the silica powder was blended so as to be 0%, 11.1%, and 66.7% relative to 100 parts by mass of the resin by volume %, and varnish was fabricated.

The fabricated varnish was spread to a thickness of 200 µm with a bar coater, and placed in a dryer at 80° C. for 30 minutes to remove the anisole solvent. Thus, an uncured maleimide resin composition was prepared.

(2) Each uncured maleimide resin composition prepared was placed in a mold of 60 mm×60 mm×100 µm, cured in a handpress at 180° C. for 10 minutes at 30 MPa, and then completely cured in a dryer at 180° C. in 1 hour to fabricate a cured resin sheet. The cured resin sheet was cut to a size of 50 mm×50 mm, and the dielectric loss tangent at 10 GHz was measured using SPDR (Split post dielectric resonators) for measuring dielectric constant with dielectric resonator at a frequency of 10 GHz (manufactured by Keysight Technologies).

(3) A line of the volume % of the silica powder against the dielectric loss tangent was made from the plot obtained by plotting the values of the given dielectric loss tangent with the volume % of the silica powder on the horizontal axis and the measured dielectric loss tangent on the vertical axis. This line was extrapolated, and the dielectric loss tangent at 100% silica powder was taken as the value of the dielectric loss tangent of silica powder.

Note that there is a measuring apparatus that is said to be able to measure silica powder directly, but such an apparatus has difficulty getting rid of the air that is mixed in due to measurement performed with the silica powder loaded in a measurement pot. In particular, measurement is even more difficult with silica powder having a large specific surface area since the mixed air has a great influence. Accordingly, in order to eliminate the influence of mixed in the air and obtain a value in a state close to the mode for actual use, the dielectric loss tangent of the silica powder was determined by the above-described measuring method in the present invention.

3. Measurement of average particle size

The average particle size was measured with a laser diffraction type particle size distribution measurement apparatus, and the mass-average value D50 in the particle size distribution was taken as the average particle size.

(Preparation Example 1): Production Example of Quartz Glass Cloth (SQ11, SQ12, and SQ13)

While extending a quartz glass thread at a high temperature, a sizing agent for quartz glass fiber was applied to fabricate and a quartz glass strand from 200 quartz glass filaments with a diameter of 5.0 µm. Next, the obtained quartz glass strand was twisted by 0.4 times per 25 mm to fabricate a quartz glass yarn.

The obtained quartz glass yarn was set in an air jet loom, and a quartz glass cloth was weaved with a plain weave with a warp count (density) of 54/25 mm, and a weft count of 54/25 mm. The quartz glass cloth had a thickness of 0.045 mm, and a cloth weight of 42.5 g/m².

The sizing agent for fiber was removed by heat-treating this quartz glass cloth at 400° C. for 10 hours. The quartz glass cloth with a width of 1.3 m and a length of 2000 m manufactured in the above was named SQ11. The dielectric loss tangent of SQ11 at a frequency of 10 GHz was 0.0011, and the tensile strength was 96 N/25 mm, and 2.26 (N/25 mm) per cloth weight (g/m$^2$).

Next, the quartz glass cloth with the width of 1.3 m and the length of 2000 m manufactured above was placed in an electric furnace set to 700° C., and heated for 5 hours. After heating, the quartz glass cloth was cooled to room temperature over 8 hours. This quartz glass cloth was named SQ12. The dielectric loss tangent of SQ12 at 10 GHz was 0.0002, and the tensile strength was 14 N/25 mm, and 0.33 (N/25 mm) per cloth weight (g/m$^2$).

Subsequently, the cooled quartz glass cloth was placed in alkaline electrolyzed water with a pH of 13 heated to 40° C., and was immersed for 48 hours to perform an etching treatment. After etching, an etched quartz glass cloth was washed with ion-exchanged water and dried to fabricate a quartz glass cloth (SQ13) with low dielectricity and high strength. The dielectric loss tangent of the quartz glass cloth SQ13 was 0.0002, and the tensile strength was 120 N/25 mm, and 2.82 (N/25 mm) per cloth weight (g/m$^2$).

The amount of impurity metal contained in the quartz glass cloth was 0.5 ppm in SQ11, SQ12, and SQ13 by the sum total of alkali metal, P (phosphorus) content was 0.1 ppm, and U and Th contents were 0.1 ppb each. The content of each element was measured by an atomic absorption method (in terms of mass).

Note that each quartz glass cloth SQ11, SQ12, and SQ13 were subjected to a surface treatment with a silane coupling agent KBM-903 (product name, 3-aminopropyltrimethoxysilane manufactured by Shin-Etsu Chemical Co., Ltd.) in the following step, and then the tensile strength was measured.

(Step)

The quartz glass cloth was immersed in a 0.5 mass % KBM-903 aqueous solution for 10 minutes, and was subsequently heated and dried at 110° C. for 20 minutes for surface treatment.

(Preparation Example 2): Production Example of Quartz Glass Cloth (SQ21, SQ22, and SQ23)

In the same manner as Preparation Example 1, a quartz glass strand was fabricated from 100 quartz glass filaments with a diameter of 5.0 μm. Next, the obtained quartz glass strand was twisted by 0.8 times per 25 mm to fabricate a quartz glass yarn.

The obtained quartz glass yarn was set in an air jet loom, and a quartz glass cloth was weaved with a plain weave with a warp count of 66/25 mm, and a weft count of 66/25 mm. The quartz glass cloth had a thickness of 0.030 mm, and a cloth weight of 26.5 g/m$^2$.

The sizing agent for fiber was removed by heat-treating this quartz glass cloth at 400° C. for 10 hours. The quartz glass cloth with a width of 1.3 m and a length of 2000 m manufactured in the above was named SQ21. The dielectric loss tangent of SQ21 at a frequency of 10 GHz was 0.0011, and the tensile strength was 49 N/25 mm, and 1.85 (N/25 mm) per cloth weight (g/m$^2$).

Next, the quartz glass cloth with the width of 1.3 m and the length of 2000 m manufactured above was placed in an electric furnace set to 700° C., and heated for 5 hours. After heating, the quartz glass cloth was cooled to room temperature over 8 hours. This quartz glass cloth was named SQ22. The dielectric loss tangent of SQ22 at 10 GHz was 0.0002, and the tensile strength was 9 N/25 mm, and 0.34 (N/25 mm) per cloth weight (g/m$^2$).

Subsequently, the cooled quartz glass cloth was placed in alkaline electrolyzed water with a pH of 13 heated to 40° C., and was immersed for 48 hours to perform an etching treatment. After etching, the quartz glass cloth was washed with ion-exchanged water and dried to fabricate a quartz glass cloth (SQ23) with low dielectricity and high strength. The dielectric loss tangent of the quartz glass cloth SQ23 at 10 GHz was 0.0002, and the tensile strength was 79 N/25 mm, and 2.98 (N/25 mm) per cloth weight (g/m$^2$). The metal content in the quartz glass cloth was measured in the same manner as in Preparation Example 1, and similar results were obtained.

Table 1 shows the type of quartz glass cloth fabricated and the performed treatments.

TABLE 1

| | Quartz glass cloth type | | | | | |
|---|---|---|---|---|---|---|
| | SQ11 | SQ12 | SQ13 | SQ21 | SQ22 | SQ23 |
| Glass cloth thickness (mm) | | 0.045 | | | 0.030 | |
| Cloth weight (g/m$^2$) | | 42.5 | | | 26.5 | |
| Tensile strength (N/25 mm) | 96 | 14 | 120 | 49 | 9 | 79 |
| Tensile strength (N/25 mm) per cloth weight (g/m$^2$) | 2.26 | 0.33 | 2.82 | 1.85 | 0.34 | 2.98 |
| Dielectric loss tangent at 10 GHz | 0.0011 | 0.0002 | 0.0002 | 0.0011 | 0.0002 | 0.0002 |
| Heat treatment (700° C./5 hrs) | — | + | + | — | + | + |
| Etching treatment (40° C./48 hrs) | — | — | + | — | — | + |
| KBM-903 treatment | + | + | + | + | + | + |

In the Table, "+" shows the performed treatment.

(Preparation Example 3): Fabrication Example of Low Dielectric Loss Tangent Silica Powder (S1)

5 kg of silica (SO-E5 manufactured by ADMATECHS) with an average particle size of 1.5 μm and a dielectric loss tangent of 0.0015 at 10 GHz was placed in an alumina container and heated in a muffle furnace (manufactured by AS ONE Corporation) in the air at 900° C. for 12 hours, and then cooled to room temperature over 6 hours to obtain heat-treated silica. The heat-treated silica after the heat treatment was placed in a plastic container containing 20 liters of alkaline electrolyzed water with a pH of 13 and stirred for 2 hours while heating at 60° C. to remove a strained layer on the particle surface. Subsequently, etched silica was separated with a centrifugal separator, then washed with methanol, and dried. The dried silica disintegrated with a ball mill to give the silica. This had a dielectric loss tangent of 0.0002 at 10 GHz. The silica (S1) was subjected to a surface treatment with a silane coupling agent KBM-503 (product name, 3-methacryloxypropyltrimethoxysilane manufactured by Shin-Etsu Chemical Co., Ltd.), and this was used to manufacture a resin substrate.

(Preparation Example 4): Fabrication Example of Low Dielectric Loss Tangent Silica Powder (S2)

Heat-treated silica was prepared in the same manner as Preparation Example 3. Specifically, 5 kg of silica (SO-E5 manufactured by ADMATECHS) with an average particle size of 1.5 μm and a dielectric loss tangent of 0.0015 at 10 GHz was placed in an alumina container and heated in a muffle furnace (manufactured by AS ONE Corporation) in the air at 900° C. for 12 hours, and then cooled to room temperature over 6 hours to obtain silica. The dielectric loss tangent of the silica was 0.0002 at 10 GHz. The silica (S2) was subjected to a surface treatment with a silane coupling agent KBM-503 (product name, 3-methacryloxypropyltrimethoxysilane manufactured by Shin-Etsu Chemical Co., Ltd.), and this was used to manufacture a resin substrate.

Table 2 shows the raw material silica and the treatments performed on the treated silica.

TABLE 2

| | Silica type | | |
|---|---|---|---|
| | SO-E5 | S1 | S2 |
| Heat treatment (900° C./12 hrs) | — | + | + |
| Etching treatment (60° C./2 hrs) | — | + | — |
| Dielectric loss tangent at 10 GHz | 0.0015 | 0.0002 | 0.0002 |
| KBM-503 treatment | + | + | + |

In the Table, "+" shows the performed treatment.

[Manufacturing Fluorine Resin Substrate]

Example 1

Two tetrafluoroethylene-perfluoroalkylvinylether copolymer (PFA) films (TFE/PPVE=98.5/1.5 (mol %), MFR (melt flow rate): 14.8 g/10 minutes, melting point: 305° C.) having a thickness of 50 μm and one sheet of the annealed quartz glass cloth (SQ13) fabricated in Preparation Example 1 were provided. They were laminated in the order: PFA film/annealed quartz glass cloth/PFA film. This was hot-pressed at 325° C. for 30 minutes by using a vacuum pressure press to fabricate a fluorine resin substrate.

This fluorine resin substrate had no molding defects, and a favorable fluorine resin substrate was obtained. The fluorine resin substrate had excellent characteristics: a dielectric loss tangent of 0.0003 at 10 GHz.

Comparative Example 1

Two tetrafluoroethylene-perfluoroalkylvinylether copolymer (PFA) films (TFE/PPVE=98.5/1.5 (mol %), MFR: 14.8 g/10 minutes, melting point: 305° C.) having a thickness of 50 μm and one sheet of the annealed quartz glass cloth (SQ11) fabricated in Preparation Example 1 were provided. They were laminated in the order: PFA film/quartz glass cloth/PFA film. This was hot-pressed at 325° C. for 30 minutes by using a vacuum pressure press to fabricate a fluorine resin substrate. The obtained fluorine resin substrate had no molding defects. This had the dielectric loss tangent of 0.0007 at 10 GHz.

Comparative Example 2

Two tetrafluoroethylene-perfluoroalkylvinylether copolymer (PFA) films (TFE/PPVE=98.5/1.5 (mol %), MFR: 14.8 g/10 minutes, melting point: 305° C.) having a thickness of 50 μm and one sheet of the quartz glass cloth (SQ12) fabricated in Preparation Example 1 were provided. They were laminated in the order: PFA film/quartz glass cloth/PFA film. This was hot-pressed at 325° C. for 30 minutes by using a vacuum pressure press to fabricate a fluorine resin substrate. The strength of the quartz glass cloth of the obtained fluorine resin substrate was weak, and a press caused breakage of the cloth, and it was not possible to fabricate a favorable fluorine resin substrate. Accordingly, it was not possible to measure the dielectric loss tangent.

Table 3 shows the results.

TABLE 3

| | Example 1 | Comparative Example 1 | Comparative Example 2 |
|---|---|---|---|
| Film | PFA | PFA | PFA |
| Quartz glass cloth | SQ13 | SQ11 | SQ12 |
| Dielectric loss tangent at 10 GHz | 0.0003 | 0.0007 | — |
| Molding workability | Excellent | Excellent | Poor |

Molding workability
Excellent: there was no cloth breakage, and molding was favorable
Poor: there was cloth breakage, and molding was poor

[Prepreg and Substrate Using SLK Series, being Bismaleimide Resin]

Examples 2 to 5 and Comparative Examples 3 to 6

As (B) an organic resin, the following bismaleimide resin was used.
(B) Bismaleimide Resin
(B-1): linear alkylene group-containing bismaleimide resin SLK-3000 (product name, manufactured by Shin-Etsu Chemical Co., Ltd.) represented by the following formula (2)

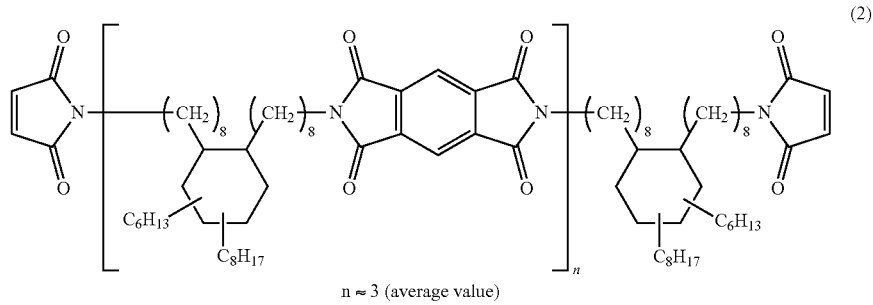

n ≈ 3 (average value)

(B-2): linear alkylene group-containing bismaleimide resin SLK-2500 (product name, manufactured by Shin-Etsu Chemical Co., Ltd.) represented by the following formula (3)

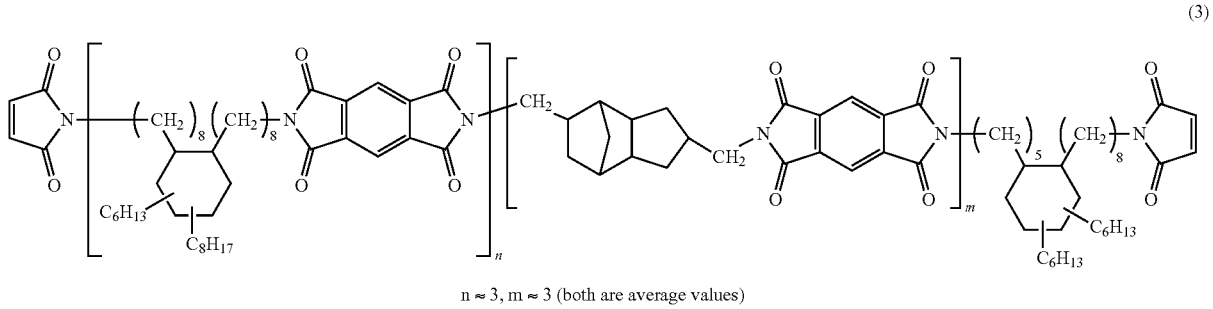

n ≈ 3, m ≈ 3 (both are average values)

<Preparation of Slurry>

Preparation Example 5

100 parts by mass of SLK-3000 (product name, manufactured by Shin-Etsu Chemical Co., Ltd.), 100 parts by mass of the silica powder (S1) fabricated in Preparation Example 3, and 2 parts by mass of dicumyl peroxide (product name: Percumyl D, manufactured by NOF Corporation) were added into anisole as a solvent. This was premixed with a stirrer to fabricate a 60% slurry solution, and a bismaleimide resin slurry composition having a uniformly dispersed filler was prepared.

Preparation Example 6

100 parts by mass of SLK-3000 (product name, manufactured by Shin-Etsu Chemical Co., Ltd.), 100 parts by mass of the silica powder (S2) fabricated in Preparation Example 4, and 2 parts by mass of dicumyl peroxide (product name: Percumyl D, manufactured by NOF Corporation) were added into anisole as a solvent. This was premixed with a stirrer to fabricate a 60% slurry solution, and a bismaleimide resin slurry composition having a uniformly dispersed filler was prepared.

Preparation Example 7

100 parts by mass of SLK-2500 (product name, manufactured by Shin-Etsu Chemical Co., Ltd.), 100 parts by mass of the silica powder (S1) fabricated in Preparation Example 3, and 2 parts by mass of dicumyl peroxide (product name: Percumyl D, manufactured by NOF Corporation) were added into anisole as a solvent. This was premixed with a stirrer to fabricate a 60% slurry solution, and a bismaleimide resin slurry composition having a uniformly dispersed filler was prepared.

Preparation Example 8

100 parts by mass of SLK-3000 (product name, manufactured by Shin-Etsu Chemical Co., Ltd.), 100 parts by mass of the silica powder (SO-E5 manufactured by ADMATECHS) used as the raw material for the silica powder (S1) fabricated in Preparation Example 3, and 2 parts by mass of dicumyl peroxide (product name: Percumyl D, manufactured by NOF Corporation) were added into anisole as a solvent. This was premixed with a stirrer to fabricate a 60% slurry solution, and a bismaleimide resin slurry composition having a uniformly dispersed filler was prepared.

<Fabrication of Prepreg>

The quartz glass cloths SQ11, SQ12, and SQ13 were impregnated with the slurry compositions fabricated in the above Preparation Examples 5 to 8. Then, the resultant dried at 120° C. for 5 minutes to fabricate prepreg. In this event, the adhered amount was adjusted to be 44% by mass. Subsequently, three sheets of the fabricated prepreg were laminated and, using a vacuum decompression press, this laminate was cured in steps: at 150° C. for 1 hour; and furthermore, at 180° C. for 2 hours. Thus, resin substrates (Examples 2 to 5 and Comparative Examples 3 to 6) were fabricated.

Subsequently, a network analyzer (E5063-2D5, manufactured by Keysight Technologies) and strip lines (manufactured by KEYCOM Corp.) were connected, and the dielectric loss tangent of the cured resin substrates at a frequency of 10 GHz was measured.

In Comparative Example 3 and Comparative Example 4, it was not possible to fabricate a resin substrate due to poor molding, and it was not possible to measure the dielectric loss tangent.

Table 4 shows the results.

TABLE 4

| | Example/Comparative Example | | | | | | | |
|---|---|---|---|---|---|---|---|---|
| | Example 2 | Example 3 | Example 4 | Example 5 | Comparative Example 3 | Comparative Example 4 | Comparative Example 5 | Comparative Example 6 |
| Preparation Example | 5 | 6 | 7 | 8 | 5 | 6 | 5 | 8 |
| Quartz glass cloth | | SQ13 | | | | SQ12 | | SQ11 |
| SLK-3000 | + | + | | + | + | + | + | + |
| SLK-2500 | | | + | | | | | |

TABLE 4-continued

|  | Example 2 | Example 3 | Example 4 | Example 5 | Comparative Example 3 | Comparative Example 4 | Comparative Example 5 | Comparative Example 6 |
|---|---|---|---|---|---|---|---|---|
| Silica powder (SO-E5) |  |  |  | + |  |  |  | + |
| Silica powder (S1) | + |  | + |  | + |  | + |  |
| Silica powder (S2) |  | + |  |  |  | + |  |  |
| Dielectric loss tangent at | 0.0009 | 0.0009 | 0.0010 | 0.0011 | — | — | 0.0013 | 0.0015 |
| Molding workability | Excellent | Excellent | Excellent | Excellent | Poor | Poor | Excellent | Excellent |

In the Table, "+" shows the performed treatment.
Molding workability
Excellent: there was no cloth breakage, and molding was favorable
Poor: there was cloth breakage, and molding was poor Example 6 and Comparative Examples 7 and 8

In the same manner as Examples 2 to 5 and Comparative Examples 3 to 6, the quartz glass cloths SQ21, SQ22, and SQ23 were impregnated with the slurry composition fabricated in Preparation Example 5. Then, the resultant dried at 120° C. for 5 minutes to fabricate prepreg. In this event, the adhered amount was adjusted to be 44% by mass. Subsequently, three sheets of the fabricated prepreg were laminated and, using a vacuum decompression press, the laminate was cured in steps: at 150° C. for 1 hour; and furthermore, at 180° C. for 2 hours. Thus, resin substrates were fabricated.

Subsequently, a network analyzer (E5063-2D5, manufactured by Keysight Technologies) and strip lines (manufactured by KEYCOM Corp.) were connected, and the dielectric loss tangent of the cured resin substrates at a frequency of 10 GHz was measured.

In Comparative Example 7, it was not possible to form a resin substrate due to poor molding, and it was not possible to measure the dielectric loss tangent.

Table 5 shows the results.

TABLE 5

|  | Example 6 | Comparative Example 7 | Comparative Example 8 |
|---|---|---|---|
| Preparation Example | 5 | 5 | 5 |
| Quartz glass cloth | SQ23 | SQ22 | SQ21 |
| SLK-3000 | + | + | + |
| Silica powder (S1) | + | + | + |
| Dielectric loss tangent at 10 GHz | 0.0009 | — | 0.0013 |
| Molding workability | Excellent | Poor | Excellent |

In the Table, "+" shows the performed treatment.

In the Table, "+" shows the used material.
Molding Workability
Excellent: there was no cloth breakage, and molding was favorable
Poor: there was cloth breakage, and molding was poor
[Prepreg and Laminate Substrate Using Cyanate Ester Resin]

Example 7

90 parts by mass of Primaset PT-60 (manufactured by Lonza, 119 cyanate group equivalents) as a cyanate ester resin, 10 parts by mass of a phenol compound TD2131 (manufactured by DIC, 110 phenolic hydroxy group equivalents), and 800 parts by mass of the silica (S2) fabricated in Preparation Example 4 were added into 500 parts by mass of methyl ethyl ketone as a solvent. The mixture was mixed uniformly with a high-speed mixing apparatus to prepare a dispersion.

A quartz glass cloth (SQ13) was immersed in this methyl ethyl ketone dispersion of the cyanate ester resin composition to impregnate the quartz glass cloth with the dispersion, and the adhered amount was adjusted to be 44% by mass. This impregnated glass cloth was left in a hot-air dryer at 60° C. for 2 hours to allow the solvent to volatilize, and thus, prepreg was fabricated. This prepreg had no tackiness at room temperature, and was also a substrate easy to handle. Two sheets of the prepreg manufactured here were superimposed, cured under pressure and heating with a hot press at 170° C. for 1 hour, and molded. Then, this was further subjected to a secondary curing at 185° C. for 1 hour to obtain a cyanate ester resin laminate substrate. Subsequently, a network analyzer (E5063-2D5, manufactured by Keysight Technologies) and strip lines (manufactured by KEYCOM Corp.) were connected, and the dielectric loss tangent of the cured resin substrate at a frequency of 10 GHz was measured. The dielectric loss tangent was 0.0008 at 10 GHz.

Comparative Example 9

90 parts by mass of Primaset PT-60 (manufactured by Lonza, 119 cyanate group equivalents) as a cyanate ester resin, 10 parts by mass of a phenol compound TD2131 (manufactured by DIC, 110 phenolic hydroxy group equivalents), and 800 parts by mass of the silica powder (SO-E5 manufactured by ADMATECHS) used as the raw material for the silica powder (S1) fabricated in Preparation Example 3 were added into 500 parts by mass of methyl ethyl ketone as a solvent. The mixture was mixed uniformly with a high-speed mixing apparatus to prepare a dispersion.

A quartz glass cloth (SQ11) was immersed in this methyl ethyl ketone dispersion of the cyanate ester resin composition to impregnate the quartz glass cloth with the dispersion, and the adhered amount was adjusted to be 44% by mass. This impregnated glass cloth was left in a hot-air dryer at 60° C. for 2 hours to allow the solvent to volatilize, and thus, prepreg was fabricated. This prepreg had no tackiness at room temperature, and was also a substrate easy to handle. Two sheets of the prepreg manufactured here were superimposed, cured under pressure and heating with a hot-press at 170° C. for 1 hour, and molded. Then, this was further subjected to a secondary curing at 185° C. for 1 hour to obtain a cyanate ester resin laminate substrate. Subsequently, in the same manner as in Example 7, the dielectric loss tangent of the cured resin substrate at a frequency of 10 GHz was measured. The dielectric loss tangent at 10 GHz was 0.0017.

The inventive low dielectric resin substrates of Examples 1 to 7 had a lower dielectric loss tangent compared with the substrates using conventional quartz glass cloths (SQ11 and SQ21) (Comparative Examples 1, 5, 6, 8, and 9). Moreover, since the tensile strength of the compounded quartz glass cloth was high, the strength of the substrate itself was also excellent, and the substrates were excellent in molding workability.

In addition, as clearly shown in the comparison of the results of Example 2 with Comparative Example 5, and Example 5 with Comparative Example 6, the inventive substrates (Examples 2 and 5) had lower dielectric loss tangents compared with the substrates using conventional quartz glass cloths (Comparative Examples 5 and 6) even in cases where a silica powder was further contained as a filler. When the silica powder to be loaded has a low dielectric loss tangent itself, dielectric characteristics can be remarkably improved while adjusting the expansion coefficient, modulus of elasticity, and so forth of the substrate (Examples 2 to 4, 6, and 7).

Meanwhile, in the substrates outside the range of the present invention (Comparative Examples 1 to 9), quartz glass cloths excellent in tensile strength while also having a low dielectric loss tangent were not used. Therefore, it was not possible to impart both a low dielectric loss tangent and molding workability.

In addition, in the inventive low dielectric resin substrate, the dielectric loss tangent of the quartz glass cloth to be used itself is low, and tensile strength is also excellent. Therefore, choices for the organic resin to be compounded with this quartz glass cloth become wider. Together with this fact, by appropriately selecting the organic resin to form a composite with, it is possible to manufacture a substrate after once obtaining a prepreg by impregnation. Alternatively, a substrate can also be manufactured without using a prepreg by fusing a molded resin.

Thus, since the inventive low dielectric resin substrate has a low dielectric loss tangent and is excellent in tensile strength, this can be used suitably in high-speed communication substrates, antenna substrates, etc. with little transmission loss even when used with high-frequency waves such as millimeter waves. In addition, the inventive low dielectric resin substrate is also compatible with achieving high density mounting and extreme thinness of circuit boards, and has a high utility value in the field of high-speed communication such as 5G.

Furthermore, in the present invention, silica powder, being a typical, widely used inorganic powder, and also being a material having a small expansion coefficient and being excellent in insulation and dielectric characteristics as an inorganic powder to be added in resin, can be blended while keeping the dielectric loss tangent of the substrate low. Therefore, it can be considered that such silica powder can be developed for a wide variety of uses as fillers for substrates for high-speed communication, antenna substrates, and so forth, which are expected to be greatly developed hereafter. In particular, even in a case where a silica powder is further contained as a filler, the dielectric loss tangent of the substrate can be made lower by using silica powder having a low dielectric loss tangent of less than 0.0010 at 10 GHz. Therefore, utility value for the above-described uses is extremely high.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A low dielectric resin substrate, which is a composite comprising an annealed quartz glass cloth and an organic resin, wherein
   the annealed quartz glass cloth has a dielectric loss tangent of less than 0.0010 at 10 GHz, and tensile strength of 1.0 N/25 mm or more per cloth weight (g/m$^2$).

2. The low dielectric resin substrate according to claim 1, further comprising a silica powder having a dielectric loss tangent of less than 0.0010 at 10 GHz, and an average particle size of 0.1 to 30 μm.

3. The low dielectric resin substrate according to claim 2, wherein the organic resin is a thermoplastic resin.

4. The low dielectric resin substrate according to claim 3, wherein the thermoplastic resin is one or more thermoplastic resins selected from polyphenylene ether, polyether ether ketone, polyether ketone, polyether sulfone, and fluorine resin.

5. The low dielectric resin substrate according to claim 2, wherein the organic resin is a thermosetting resin.

6. The low dielectric resin substrate according to claim 5, wherein the thermosetting resin is one or more thermosetting resins selected from epoxy resin, allylated epoxy resin, allylated polyphenylene ether resin, maleimide resin, bismaleimide resin, cyanate resin, and cyclopentadiene-styrene copolymer resin.

7. The low dielectric resin substrate according to claim 1, wherein the organic resin is a thermoplastic resin.

8. The low dielectric resin substrate according to claim 7, wherein the thermoplastic resin is one or more thermoplastic resins selected from polyphenylene ether, polyether ether ketone, polyether ketone, polyether sulfone, and fluorine resin.

9. The low dielectric resin substrate according to claim 1, wherein the organic resin is a thermosetting resin.

10. The low dielectric resin substrate according to claim 9, wherein the thermosetting resin is one or more thermosetting resins selected from epoxy resin, allylated epoxy resin, allylated polyphenylene ether resin, maleimide resin, bismaleimide resin, cyanate resin, and cyclopentadiene-styrene copolymer resin.

* * * * *